Dec. 15, 1925.　　　　　　　　　　　　　　　　1,566,230
G. H. SCANLAN
TRACTOR
Filed Aug. 13, 1921　　　3 Sheets-Sheet 1
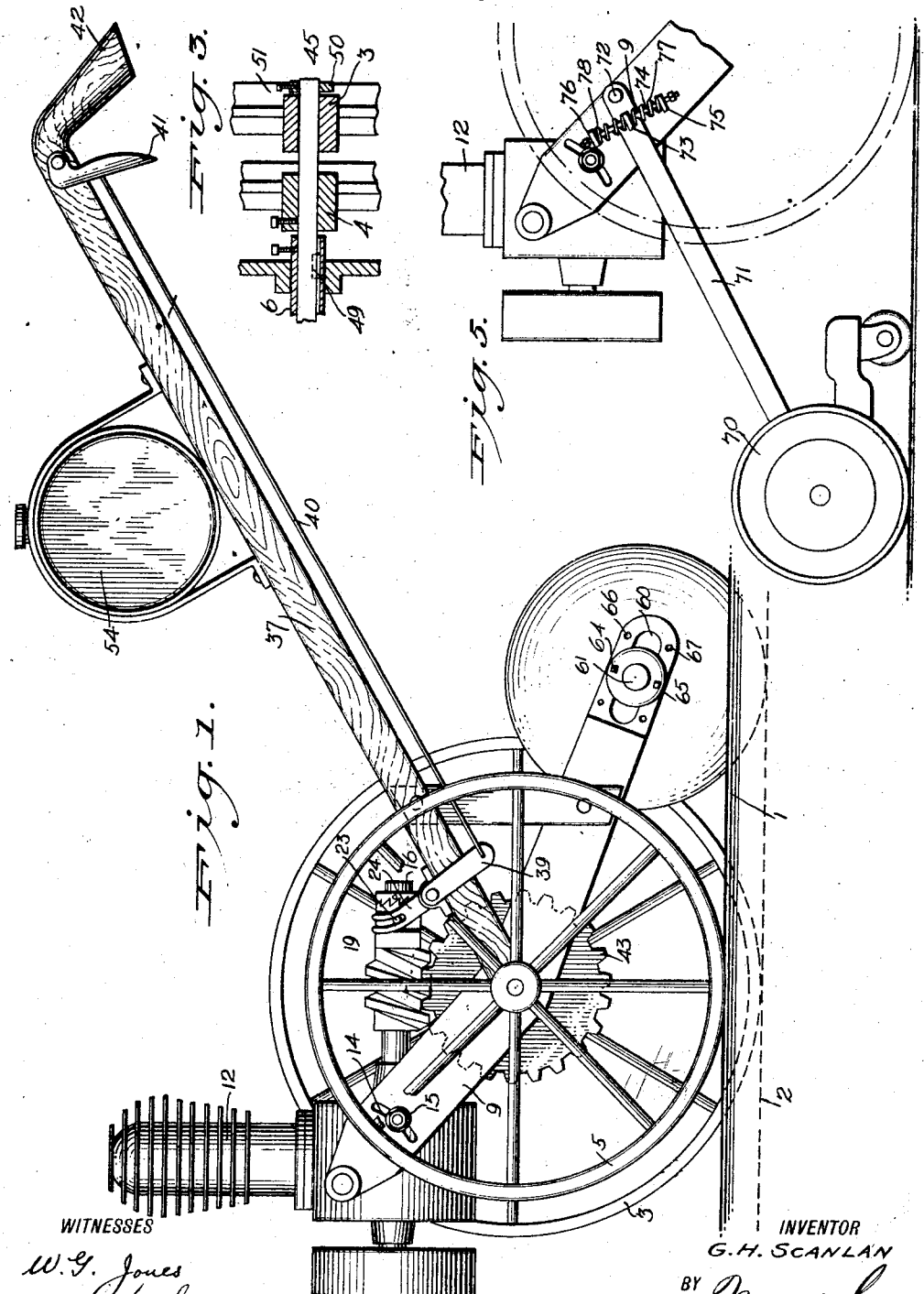
WITNESSES
W. G. Jones
A. L. Kitchin
INVENTOR
G. H. SCANLAN
BY
ATTORNEYS

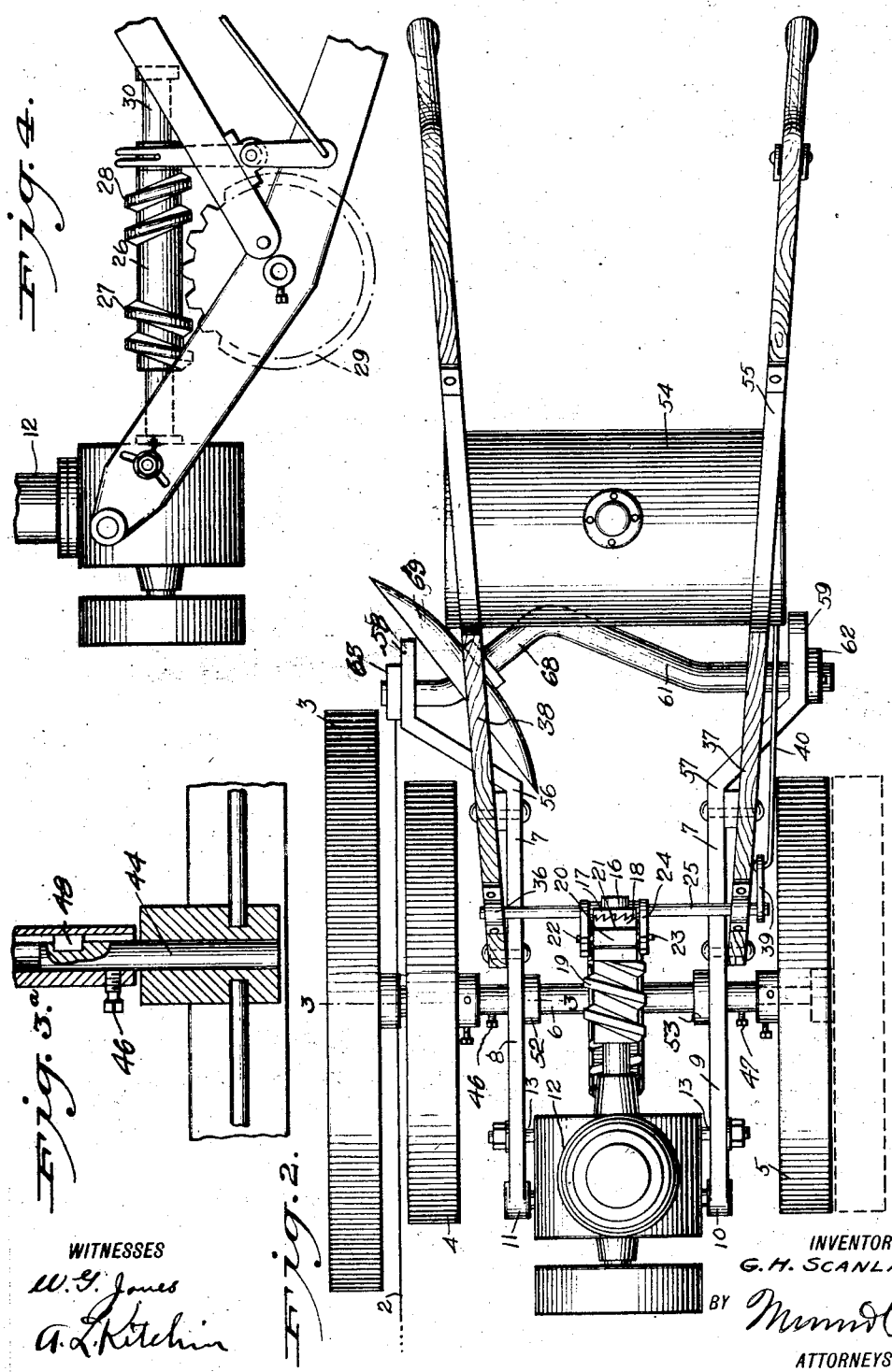

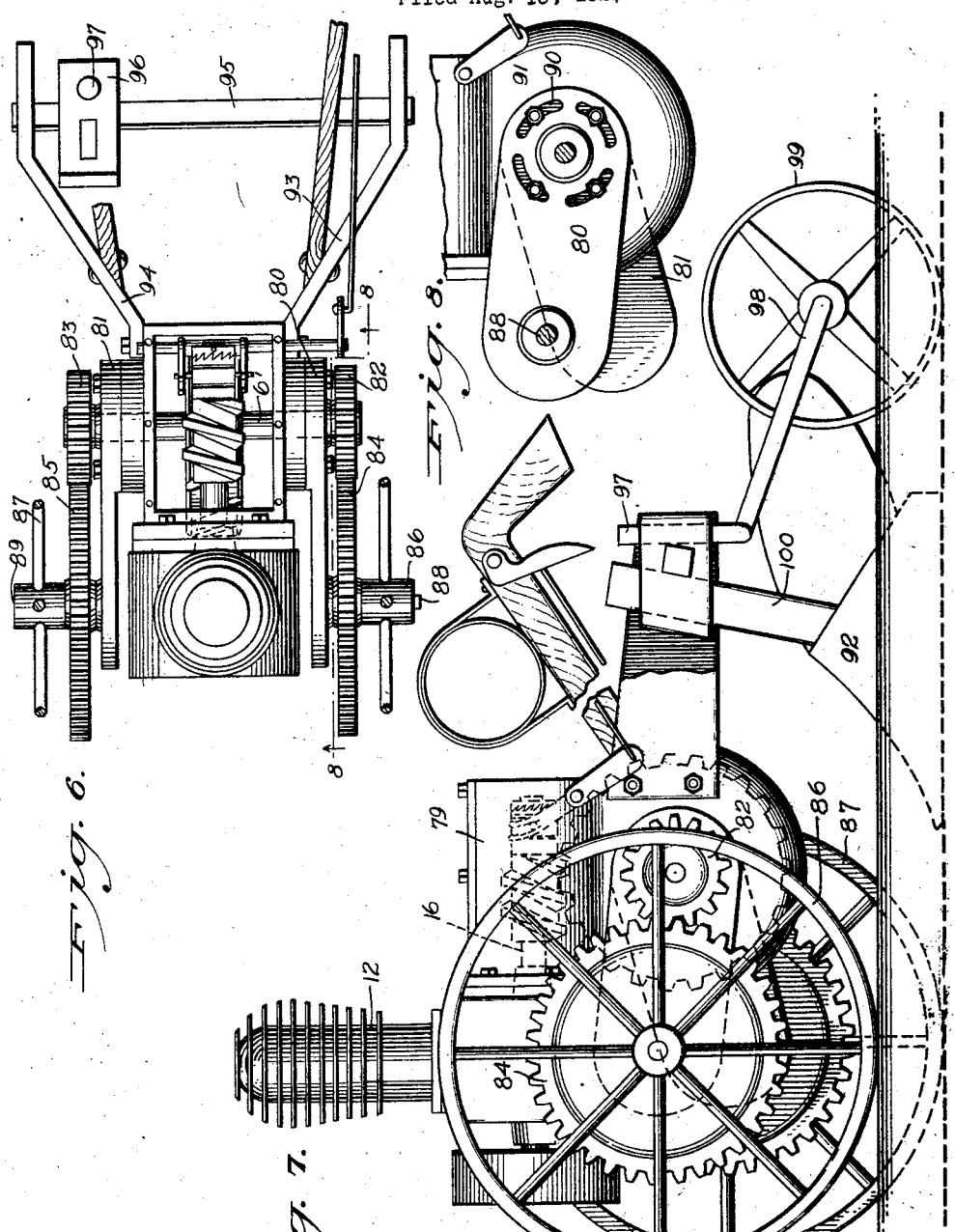

Patented Dec. 15, 1925.

1,566,230

UNITED STATES PATENT OFFICE.

GEORGE H. SCANLAN, OF NEW YORK, N. Y.; MARY G. SCANLAN ADMINISTRATRIX OF SAID GEORGE H. SCANLAN, DECEASED.

TRACTOR.

Application filed August 13, 1921. Serial No. 491,991.

*To all whom it may concern:*

Be it known that I, GEORGE H. SCANLAN, a citizen of the United States, and a resident of the city of New York, borough of Manhattan, in the county and State of New York, have invented a new and Improved Tractor, of which the following is a full, clear, and exact description.

This invention relates to tractors and particularly to an improved form of light tractor for garden and farm use and has for an object to provide a construction which may be adjusted to secure high speed with comparatively small power or slow speed with a comparatively great power.

Another object in view is to provide a small, simple and inexpensive construction which will readily operate for pulling or pushing implements.

A further object of the invention is to provide a tractor in which the traction wheels may be moved apart or toward each other and the implements adjusted readily to suit varying conditions so that disk plows, breaking plows and other implements may be readily actuated.

A further object is to provide a tractor in which a guiding or steering wheel is provided, which wheel co-acts with the traction wheels but operates in a furrow while acting to assist in maintaining the traction wheels on the unplowed ground.

An additional object is to provide a tractor in which different speeds and different tractive force is secured by change of gears and also different direction of travel may be secured by a simple manipulation of one of the driving elements whereby the tractor will move forwardly or rearwardly at any time.

In the accompanying drawings—

Figure 1 is a side view of a tractor disclosing one embodiment of the invention.

Figure 2 is a top plan view of the tractor shown in Figure 1.

Figure 3 is a fragmentary sectional view through Figure 2 on line 3—3, the same being on an enlarged scale.

Figure 4 is a fragmentary side view showing a modified construction of driving means to that illustrated in Figures 1 and 2.

Figure 5 is a fragmentary side view of the tractor shown in Figure 1 with an attachment for securing a lawn mower to the tractor.

Figure 6 is a top plan view of a modified form of the invention to that shown in Figure 1, certain parts being broken away.

Figure 7 is a side view of the tractor shown in Figure 6.

Figure 8 is a fragmentary sectional view through Figure 6 approximately on line 8—8.

Referring to the accompanying drawings by numeral, 1 indicates the unplowed ground and 2 the bottom of a furrow in which the large guide wheel 3 operates. The tractor shown in Figures 1 and 2 is provided not only with the guide wheel 3 operating in the furrow 2, but tractions wheels 4 and 5 carried by a hollow axle 6 rigidly secured by the frame 7, which frame consists of substantially identically constructed draft bars 8 and 9 pivotally mounted at 10 and 11 on stubs projecting from the engine 12. The engine 12 is any desired standard engine or any preferred engine and may be of any suitable size and power. As it is aimed to make the tractor comparatively small and light, the power of the engine is usually small and, consequently, leverage means have been provided for causing the engine to give an appreciable pull on the traction wheels 4 and 5. A pair of studs 13 are connected with the casing of engine 12 and extend through suitable arc-shaped slots 14 in their respective bars 8 and 9, said studs carrying clamping nuts 15 whereby the relative angle of the engine 12 and frame 7 may be varied as desired. The engine 12 is provided with a shaft 16 which extends at appreciable distance to the rear and to which is secured a clutch member 17 having teeth facing toward the engine so as to readily engage the teeth of clutch member 18 secured rigidly to or formed integral with a worm 19 loosely mounted on shaft 16. A collar 20 is loosely mounted in a groove 21 in the clutch member 18 whereby when said collar is moved back and forth the clutch member 18 is moved into and out of engagement with the clutch member 17. Studs or pins 22 and 23 extend from ring 20 and engage the arms of fork 24 which fork is rigidly secured to a shaft 25 rotatably mounted in suitable brackets 36 on the handle bars 37 and 38. An arm 39 is rigidly secured to the shaft 25 and to said arm a pull rod 40 is pivotally connected, said pull rod being also pivotally connected with the hand grip lever 41 (Fig. 1) pivotally mounted on the hand bar 37.

By this construction and arrangement, whenever the hand grip 41 is moved toward the grip 42 of the handle bar 37, shaft 25 will be rocked for moving the clutch member 18 out of engagement with the clutch member 17 and, consequently, disconnecting the power from the worm 19. When it is intended to throw in the power, the hand grip 41 is forced away from the grip 42 until the parts assume the position shown in Figures 1 and 2, whereupon the clutches are properly engaged. In order to connect the power with the traction wheels 4 and 5, a worm wheel 43 is rigidly secured to the shaft 6 and is positioned directly beneath the worm 19 as shown in Figure 2 so that said worm is continuously engaging the same and will cause a rotation thereof and shaft 6 when the engine is rotated and the clutch members 17 and 18 are engaged.

The shaft 6 is made hollow and is provided with stub shafts 44 and 45 at each end, said stub shafts being connected by suitable set screws 46 and 47 to shaft 6 and also, if desired, by keys or splines 48 and 49. The respective wheels 4 and 5 are secured to the stub shafts rigidly in any desired manner, as for instance, by keys and set screws though other means might be provided without departing from the spirit of the invention. The guide wheel 3, however, is loosely mounted on the stub shaft 45 and is held in position by a suitable collar 50 locked in place by a set screw 51. By this construction and arrangement, the wheel 3 may be applied and removed at any time and, consequently, the tractor may be used as shown in Figures 1 and 2 or may be used without the wheel 3 which will be the case when the tractor is used for driving a lawn mower as shown in Figure 5.

It will be noted that the bars 8 and 9 of frame 7 are connected in any suitable manner with the shaft 6 whereby said shaft may freely rotate therein. Preferably, suitable collars 52 and 53 are provided, but held in place by set screws for preventing shaft 6 from moving longitudinally. The handle bars 37 and 38 are also bolted or otherwise rigidly secured to frame 7 and extend a suitable distance to the rear so that an operator may freely grasp the respective grips 42 for steering the tractor. The gasoline tank 54 is arranged approximately centrally of the length of the handle bars 37 and 38 and is held in place by suitable straps 55 so that it may act as a counter-balancing weight for the engine. The gasoline may be led to the engine in any suitable manner, as for instance, by a suitable flexible pipe and the engine, of course, may be of any desired construction or type. The respective bars 8 and 9 at points 56 and 57 are bent outwardly and back to a parallel plane so that end sections 58 and 59 are provided, said end sections having slots 60 formed therein through which the shaft 61 extends, said shaft carrying suitable stops 62 and 63 which are provided with apertures for receiving suitable pins 64 and 65 (Fig. 1) which pins not only extend through these stops but also into suitable apertures 66 and 67 in the end sections 58 and 59. In this way, the shaft 61 is held so as to extend in a journally transverse direction to the direction of travel or at different angles thereto. By moving one end of shaft 61 forward and the other rearward, an appreciable angle may be secured in an easy manner. However, the shaft 61 is preferably bent so that a section 68 thereof will be continually at an appreciable angle and said section carries the disk plow 69 which is of any desired or usual type and which may be held in place in any desired manner on the section 68 so that it will properly operate for turning over the earth and providing a suitable furrow. By this construction and arrangement, the disk 69 may be caused to plow shallow or deep as preferred and in either instance to properly turn over the soil in a desirable manner.

In some instances, it may be desired to use the tractor for purposes other than plowing with the disk 69, as for instance, by pushing a lawn mower 70. This lawn mower is of the ordinary or usual construction and is arranged so that the handle 71 carries a pin 72 pivotally mounted in the bar 9 of frame 7. The handle 71 is also provided with a lug 73 having an aperture therethrough for accommodating the rod 74, which rod is loosely fitted therein and if desired may be loosely fitted in the lugs 75 and 76 projecting from the bar 9. Springs 77 and 78 surround the rod 74 and press against the respective lugs 75 and 76 and the central lug 73 so as to resiliently maintain said central lug in a central position while allowing the same to freely move therefrom against the action of one of the springs. This arrangement will permit the tractor to push the lawn mower 70 and at the same time allow said lawn mower to move in conformity to the contour of the ground.

In Figure 4, a slightly modified construction of drive is shown to that illustrated in Figures 1 and 2. In this form of the invention the sleeve 26 is provided with right and left worms 27 and 28 adapted to engage the gear wheel 29 at different times, said gear wheel having the teeth formed substantially as spur gears. In this form of the invention, the sleeve is splined to the shaft 30 instead of loosely mounted thereon as in the other form of the invention. By reason of the construction and arrangement of the worms 27 and 28, the direction of rotation of the gear wheel 29 connected with the shaft 6 may be reversed at any time and thereby drive the tractor forwardly or rearwardly without the use of ordinary reversing mechanism. In both this form of the invention and that shown in Figure 1, the gear wheels 29 and 43 respectively may be removed and larger or even smaller ones supplied to vary the speed ratio.

In Figures 6 to 8 inclusive will be seen another modified form of the invention in which the large guide wheel 3 is eliminated and in which special mechanism is provided for causing the tractor to pull a heavy load at slow speed. In this form of the invention, the engine 12 is the same as in the other form while the shaft 16 and associated parts are preferably arranged in a closed casing 79. In this form of the invention the shaft 6' is not connected directly to the traction wheels but on the contrary extends loosely through the arms 80 and 81 and have pinions 82 and 83 rigidly secured thereto, said pinions meshing with gear wheels 84 and 85, which gear wheels are rigidly secured to the respective traction wheels 86 and 87. These traction wheels are loosely mounted on suitable stub shafts 88 and 89 carried by the arms 80 and 81. The arms 80 and 81 are identical and as shown in Figure 8, the arm 80 is provided with a number of arc-shaped slots 90 for accommodating the bolts 91, which bolts may be tightened for clamping the arm 80 in any desired position. As indicated in Figures 7 and 8, arm 81 has been adjusted so that the wheel 87 will operate in a furrow while wheel 86 may operate on the unplowed ground. In this way the engine is supported in a horizontal position and yet the tractor is properly guided by action of the wheel 87 against the side of the furrow. The arrangement of these arms and the pinions and gear wheels just described permit a variation of the size of the respective pinions and gear wheels so as to vary the pulling action of the engine. Where a comparatively large plow 92 is to be pulled as shown in Figure 7, the gears 84 and 85 are much larger than the pinions 82 and 83. In case only a small power is required and comparatively high speed desired, the gear wheels will be reversed. It is also evident that other size gear wheels and pinions might be used to get some other ratio.

Bars 93 and 94 are secured by bolts or otherwise to the casing 79 and act as a frame for supporting a transverse draft bar 95, said draft bar accommodating a fitting 96 provided with an aperture for receiving the vertical section 97 of the axle 98 of the caster wheel 99. The fitting 96 is also provided with an aperture which is preferably rectangular for receiving a rectangular shank 100 of plow 92. It will be evident that the fitting 96 might be placed or adjusted to any particular location along bar 97 and may be locked in place by a set screw or other means as desired.

What I claim is:—

A tractor comprising an engine, a frame pivotally connected with the engine, a pair of traction wheels carried by said frame, a pair of guiding and balancing handles connected with said frame, driving means connected with said traction wheels, said driving means including a gear wheel, a worm meshing with said gear wheel, said worm being slidably mounted on the crank shaft of said engine, a clutch at one end of said worm for connecting said worm with said crank shaft so as to be rotated thereby and manually actuated means for shifting said clutch.

GEORGE H. SCANLAN.